(12) United States Patent
Omotani

(10) Patent No.: US 7,114,387 B2
(45) Date of Patent: Oct. 3, 2006

(54) PRESSURE DISTRIBUTION MEASURING SYSTEM

(75) Inventor: Hideo Omotani, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 80 days.

(21) Appl. No.: 11/048,844

(22) Filed: Feb. 3, 2005

(65) Prior Publication Data

US 2005/0188759 A1    Sep. 1, 2005

(30) Foreign Application Priority Data

Feb. 6, 2004    (JP)    ............................. 2004-030457

(51) Int. Cl.
*A63B 53/00*    (2006.01)
(52) U.S. Cl. .................................................. 73/170.02
(58) Field of Classification Search ............. 73/861.66, 73/170.02, 862.046, 861.65
See application file for complete search history.

(56) References Cited

U.S. PATENT DOCUMENTS 5,483,839 A * 1/1996 Meunier ................... 73/861.66
5,762,539 A * 6/1998 Nakashiba et al. ............ 451/41
6,928,884 B1 * 8/2005 Pearson .................... 73/861.42
2005/0011447 A1 * 1/2005 Fink ........................... 118/715
2006/0075831 A1 * 4/2006 Okuda .................... 73/862.046

FOREIGN PATENT DOCUMENTS

JP    2002-206987 A    7/2002
JP    2003-500640 A    1/2003

\* cited by examiner

*Primary Examiner*—Jewel Thompson
(74) *Attorney, Agent, or Firm*—Birch, Stewart, Kolasch, and Birch, LLP

(57) ABSTRACT

A measuring segment is integrally formed in a wing model. A plurality of thin membranes are formed on a surface of the measuring segment at predetermined intervals in a cord direction with a distortion gauge fixed to a back face of each of the plurality of thin membranes to output an electric signal upon distortion. The electric signals are converted by a pressure conversion means into pressures, thereby measuring a pressure distribution in an airflow direction. It is possible to prevent the generation of a step or a gap which affects an airflow along the surface of the measuring segment, thereby improving accuracy. The measuring segment is integrally molded by an optical molding method to form a complicated shape with a high accuracy and a low cost. Further, a plurality of the measuring segments may be disposed at intervals in a span direction for measuring pressure distributions.

20 Claims, 8 Drawing Sheets

PRESSURE DISTRIBUTION MEASURING SYSTEM

CROSS-REFERENCE TO RELATED APPLICATIONS

The present application is related to Japanese Patent Application No. 2004-30457 filed on Feb. 6, 2004 the entire contents of which are hereby incorporated by reference.

BACKGROUND OF THE INVENTION

1. Field of the Invention

The present invention relates to a pressure distribution measuring system for measuring a pressure distribution along a predetermined fluid flow direction on a surface of an object moving relative to a fluid.

2. Description of Background Art

A pressure distribution measuring system for measuring a pressure distribution along a predetermined fluid flow direction on a surface of an object moving relative to a fluid is used in many fields such as aircraft, marine vessels, automobiles, buildings and bridge beams.

For example, in the field of aviation, Japanese Patent Application Laid-open No. 2002-206987 discloses a wing model used for measuring a pressure distribution along a cord line on a wing surface in a wind tunnel test, in which a plurality of pressure detecting bores are formed to open in the wing surface, and a plurality of passages are formed within the wing model to connect the pressure detecting bores to pressure sensors.

Also, Published Japanese Translation No. 2003-500640 of PCT Application No. PCT/DE00/01468 discloses a pressure distribution measuring system in which a piezo-foil is bonded to an inner surface of a wing shell fixed to cover an opening formed in a wing surface of an actual airplane. Vibration of the wing shell caused by airflow along the wing surface is detected based on a signal output from the piezo-foil.

If the plurality of pressure detecting bores opening in the wing surface are formed along the cord line as disclosed in Japanese Patent Application Laid-open No. 2002-206987, the following problems occur: turbulence of airflow caused by the upstream pressure detecting bore affects the downstream pressure detecting bore, thereby degrading the accuracy in measuring a pressure distribution, and also pressure loss and pressure leakage caused by the passages formed within the wing model for connecting the pressure detecting bores to the pressure sensors affect the measuring accuracy; time lag is generated in the measurement, because the passages are long; a measurable pressure range is narrow; the measuring accuracy degrades due to stain and dust adhering to the pressure detecting bores; and the measurement in water (in the case of marine vessels) is impossible.

Also, in Published Japanese Translation No. 2003-500640 of PCT Application No. PCT/DE00/01468, the wing shell having the piezo-foil bonded to its inner surface is fixed to cover the opening formed in the wing surface, leading to a problem that a step or a gap is generated along an outer periphery of the wing shell to cause turbulence of airflow. Further, the piezo-foil has a characteristic of outputting a signal upon deformation but not outputting the signal in a steady state in which deformation amount is constant, leading to a difficulty in measuring a pressure distribution on the wing surface in the steady state.

SUMMARY AND OBJECTS OF THE INVENTION

The present invention has been accomplished with the above circumstance in view. It is an object of the present invention to provide a pressure distribution measuring system capable of accurately measuring a pressure distribution on a surface of an object.

To achieve the above object, according to the present invention, there is proposed a pressure distribution measuring system for measuring a pressure distribution along a predetermined fluid flow direction on a surface of an object moving relative to a fluid wherein the object integrally includes a measuring segment which has a predetermined width in a direction substantially vertical to the flow direction. A plurality of thin membranes are formed on a surface of the measuring segment at predetermined intervals in the flow direction. A distortion gauge is fixed to a back face of each of the plurality of thin membranes to output an electric signal which is converted by a pressure conversion means into pressure, thereby measuring the pressure distribution in the flow direction.

According to the present invention, the measuring segment includes a frame assembly constructed by connecting together longitudinal frames extending in the flow direction and lateral frames extending in a direction orthogonal to the longitudinal frames. In addition, outer peripheries of the thin membranes are connected to the longitudinal frames and the lateral frames.

According the present invention, the measuring segment is integrally formed by an optical molding method.

According to the present invention, the object includes a plurality of the measuring segments disposed at intervals in a direction substantially vertical to the flow direction.

A wing model in the embodiments corresponds to the object of the present invention.

With the arrangement of the present invention, the object is provided with the integrally formed measuring segment. A plurality of thin membranes are formed on a surface of the measuring segment at predetermined intervals in the fluid flow direction. A distortion gauge is fixed to a back face of each of the plurality of thin membranes to output an electric signal which is converted by a pressure conversion means into pressure, thereby measuring a pressure distribution in the flow direction. Therefore, it is possible to prevent the generation of a step, a gap and the like in the surface of the measuring segment which affect the fluid flow, thereby improving accuracy in measuring a pressure distribution. In addition, because the pressure detecting bores are not required, the measuring accuracy cannot be lowered due to stain and dust which adhere to the pressure detecting bores. Further, passages connecting the pressure detecting bores to pressure sensors are not required. Thus, it is possible to prevent a pressure loss, a pressure leakage and a measurement time-lag which are caused by the passages, thereby improving accuracy in measuring a pressure distribution. Furthermore, the pressure measurement range can be easily adjusted by merely changing the thickness of the thin membranes.

With the arrangement of the present invention, the measuring segment is constructed as a high-rigidity frame by connecting together the longitudinal frames extending in the fluid flow direction and the lateral frames extending in a direction orthogonal to the longitudinal frames, while outer peripheries of the thin membranes are connected to the longitudinal frames and the lateral frames. Therefore, the deformation amount of the thin membrane due to pressure acting on the surface of the object can be stabilized, to thereby improve accuracy in measuring a pressure distribution.

With the arrangement of the present invention, the measuring segment is integrally molded by the optical molding method. Thus, the measuring segment having a complicated shape can be formed with a high accuracy and a low cost.

With the arrangement of the present invention, the object includes the plurality of measuring segments disposed at the intervals in the direction vertical to the flow direction. Thus, pressure distributions at different locations on the object can be measured simultaneously.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The mode for carrying out the present invention will now be described by way of embodiments of the present invention with reference to the accompanying drawings.

Figure 1:
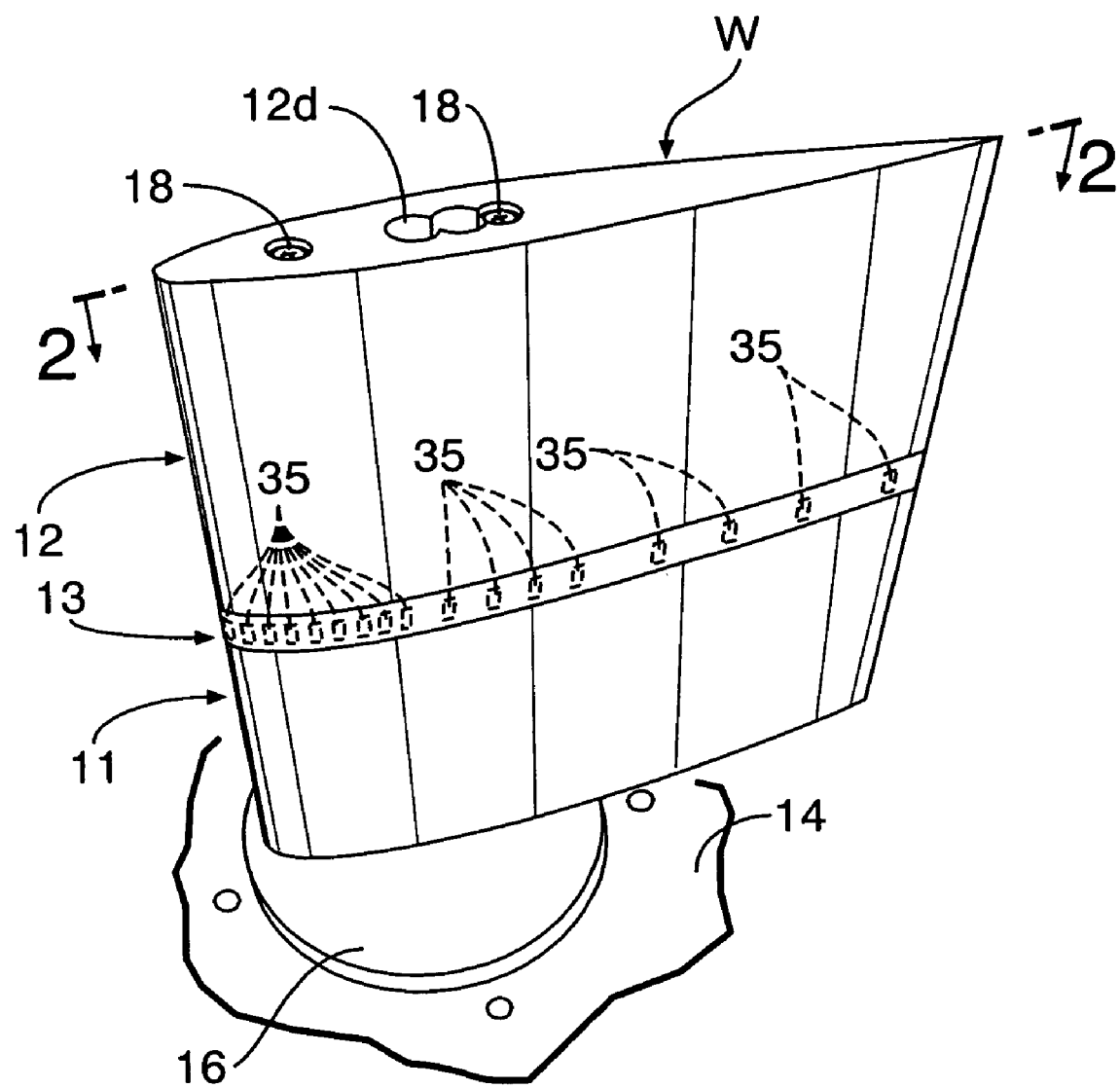
FIG. 1 is a perspective view of a wing model for a wind tunnel test.
Figure 2:
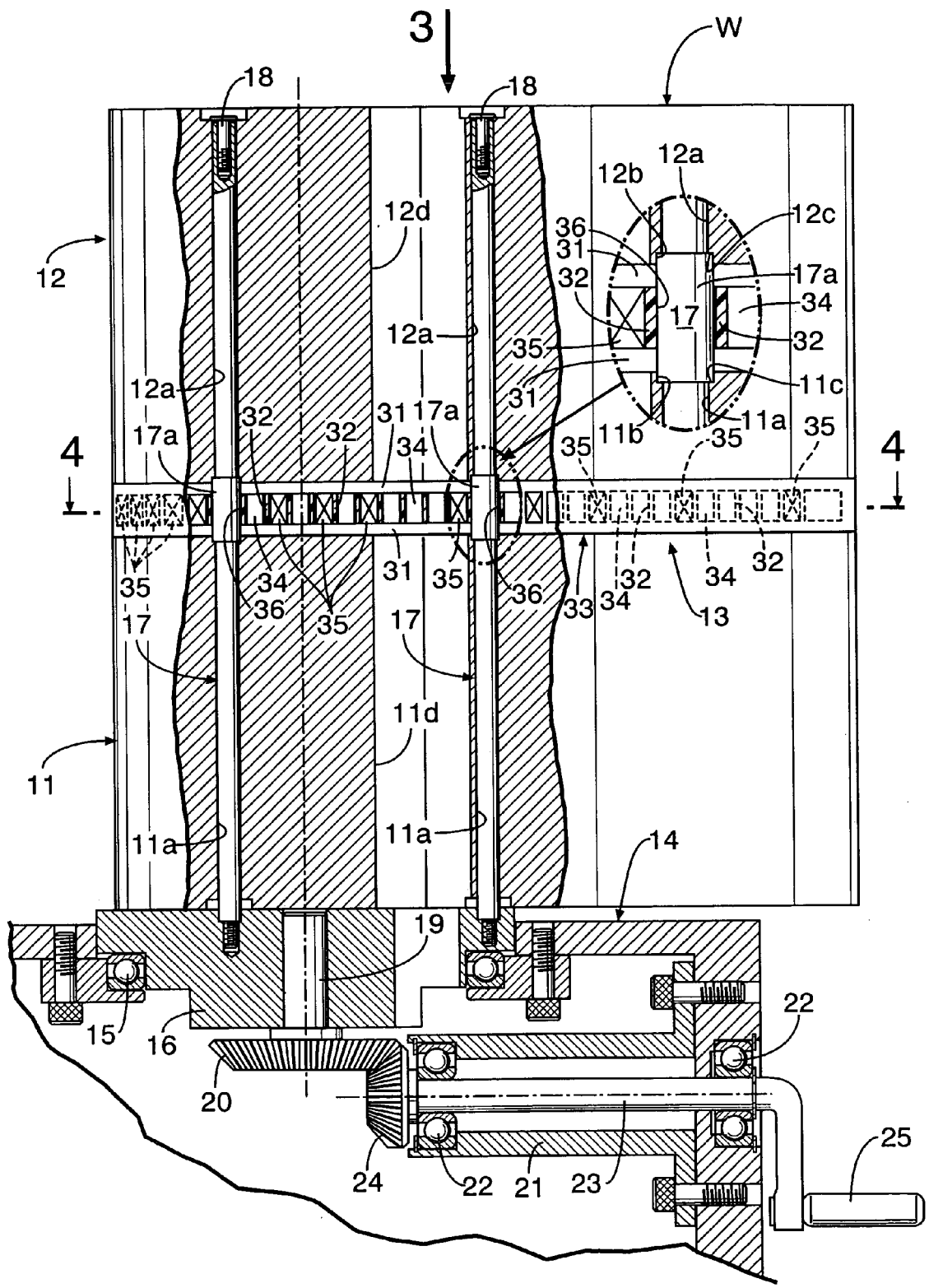
FIG. 2 is a sectional view taken along a line 2—2 in FIG. 1.
Figure 3:
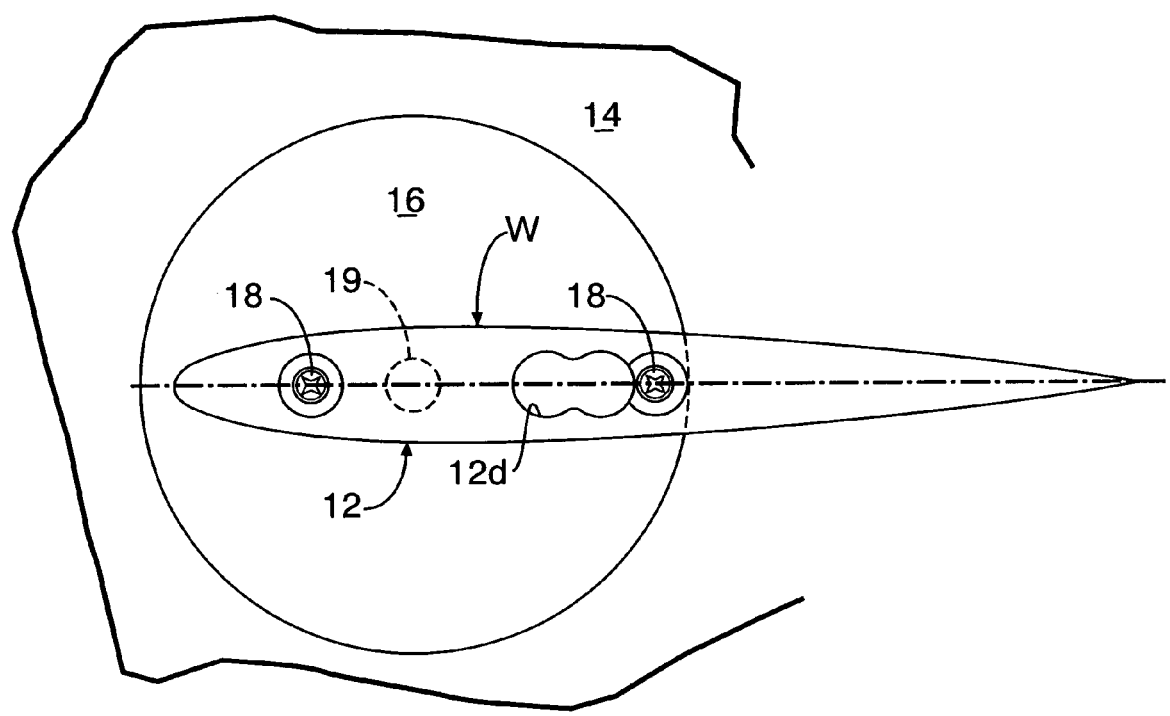
FIG. 3 is a view taken in a direction of an arrow 3 in FIG. 2.

FIGS. 1 to 3 show a wing model W used for measuring a pressure distribution on a surface of a wing of an airplane in a wind tunnel test. The wing model W includes: first and second wing bodies 11 and 12 each made of a metal and separated vertically from each other; and a measuring segment 13 made of a synthetic resin and interposed between the first and second wing bodies 11 and 12. Each of the first and second wing bodies 11 and 12 and the measuring segment 13 has a certain blade airfoil in a span direction.

The first wing body 11, the measuring segment 13 and the second wing body 12 are superposed on an upper surface of a turn table 16 rotatably carried on a base member 14 with a ball bearing 15 interposed therebetween, and are fixed by two fixing rods 17, 17 spaced apart from each other in a cord direction. More specifically, the two fixing rods 17, 17 are screwed at their lower ends into the turn table 16 to stand thereon and thereafter inserted through each two through-holes 11a, 11a; 13a, 13a; 12a, 12a formed respectively in the first wing body 11, the measuring segment 13 and the second wind body 12. The two fixing rods 17, 17 are fastened by two bolts 18, 18 screwed over upper ends thereof.

In order to ensure that fastening loads of the bolts 18, 18 do not act on the measuring segment 13, a larger-diameter portion 17a formed in the middle of each of the fixing rods 17 is fitted into a larger-diameter portion 11b formed at an end of the through-hole 11a in the first wing body 11 opposed to the measuring segment 13, and into a larger-diameter portion 12b formed at an end of the through-hole 12a in the second wing body 12, whereby the fastening loads are supported by abutment faces 11c and 12c of the larger-diameter portions 11b and 12b.

A driving bevel gear 24 is provided on a rotary shaft 23 supported on a bracket 21 fixed to the base member 14 with ball bearings 22, 22 interposed therebetween, and is meshed with a follower bevel gear 20 provided on a rotary shaft 19 extending downwardly from the center of the turn table 16. The angle of elevation of the wing model W can be changed as desired by rotating an operating handle 25 mounted on the rotary shaft 23 through the rotary shaft 23, the driving bevel gear 24, the follower bevel gear 20 and the rotary shaft 19. The position of the rotary shaft 19 is determined in the vicinity of 25% (an aerodynamic center) of a cord length of the blade airfoil, thereby minimizing the change in pitching moment due to the change in angle of elevation.

Figure 4:
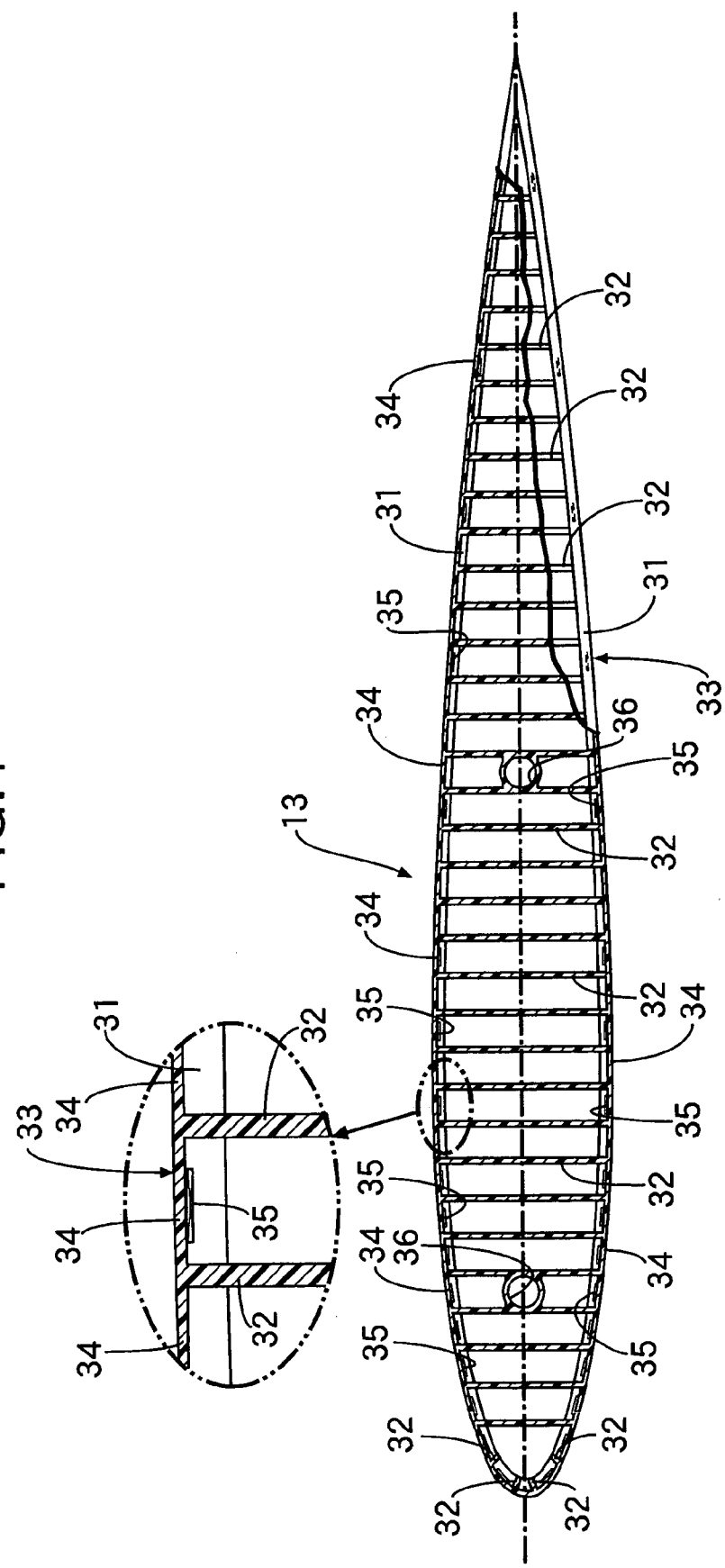
FIG. 4 is a sectional view taken along a line 4—4 in FIG. 2.
Figure 5:
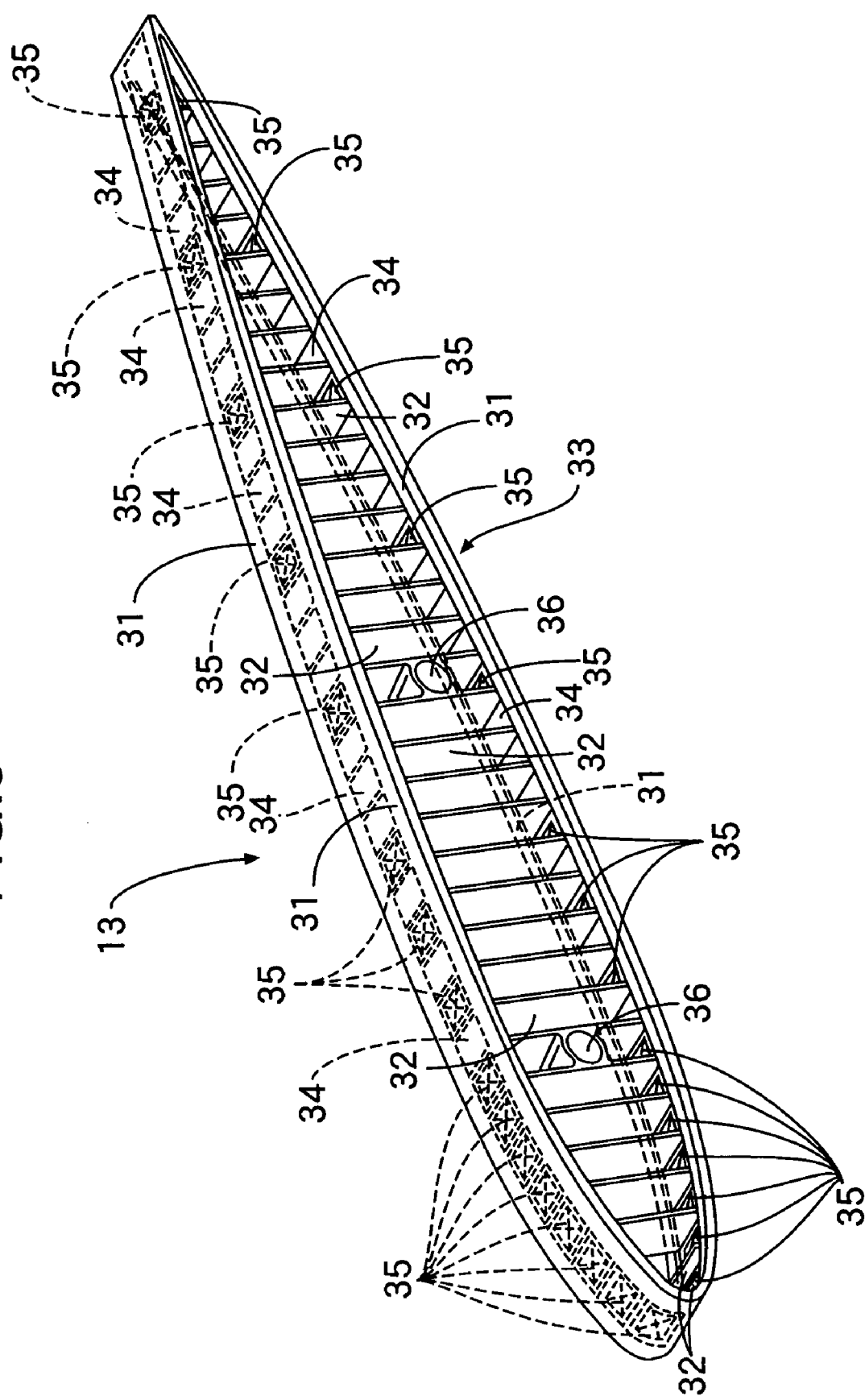
FIG. 5 is a perspective view of a measuring segment.

The structure of the measuring segment 13 will be described below with reference to FIGS. 2, 4 and 5.

The measuring segment 13 is integrally molded from a synthetic resin by an optical molding method which will be described later and includes a frame assembly 33 which is comprised of a pair of longitudinal frames 31, 31 forming a profile of the blade airfoil, and a large number of rib-shaped lateral frames 32 connecting the pair of longitudinal frames 31, 31 to each other in a span direction. Most of the lateral frames 32 interconnect portions of the longitudinal frames 31, 31 on the upper wing side and lower wing surface, but the four lateral frames in the vicinity of a leading edge extend inwards from inner surfaces of the longitudinal frames 31, 31 in a cantilever manner.

Thin membranes 34 are formed to have a small wall thickness (e.g., a thickness of 0.3 mm) so as to have flexibility. Outer peripheral portions of the thin membranes 34 are connected to inner peripheral surfaces of rectangular regions defined by the longitudinal frames 31, 31 and the lateral frames 32 which are combined together into a frame shape. The thickness of the thin membranes 34 can be changed as desired in accordance with a range of pressure to be measured. Outer surfaces of the longitudinal frames 31, 31 and the lateral frames 32 and outer surfaces of the thin membranes 34 are smoothly connected to one another without generating any step or gap, and cooperate with one another to form the blade airfoil. Known distortion gauges 35, whose electric resistance changes upon distortion, are fixed by bonding to back faces of the thin membranes 34. The distortion gauges 35 may be bonded to the back faces of all the thin membranes 34. However, in the present embodiment, the distortion gauges 35 are mounted on all the thin membranes 34 on the side of the leading edge in which a high detection accuracy of a pressure distribution is required. In addition, the distortion gauges 35 are mounted at predetermined intervals on the sides of a trailing edge in which a less detection accuracy of a pressure distribution is required (see FIG. 1).

Front and rear positioning bores 36, 36 for connecting together the two adjacent lateral frames 32, 32 are provided in the measuring segment 13. The larger-diameter portions 17a, 17a of the fixing rods 17, 17 are fitted into the positioning bores 36, 36, whereby the measuring segment 13 is positioned relative to the first and second wing bodies 11 and 12.

Figure 6:
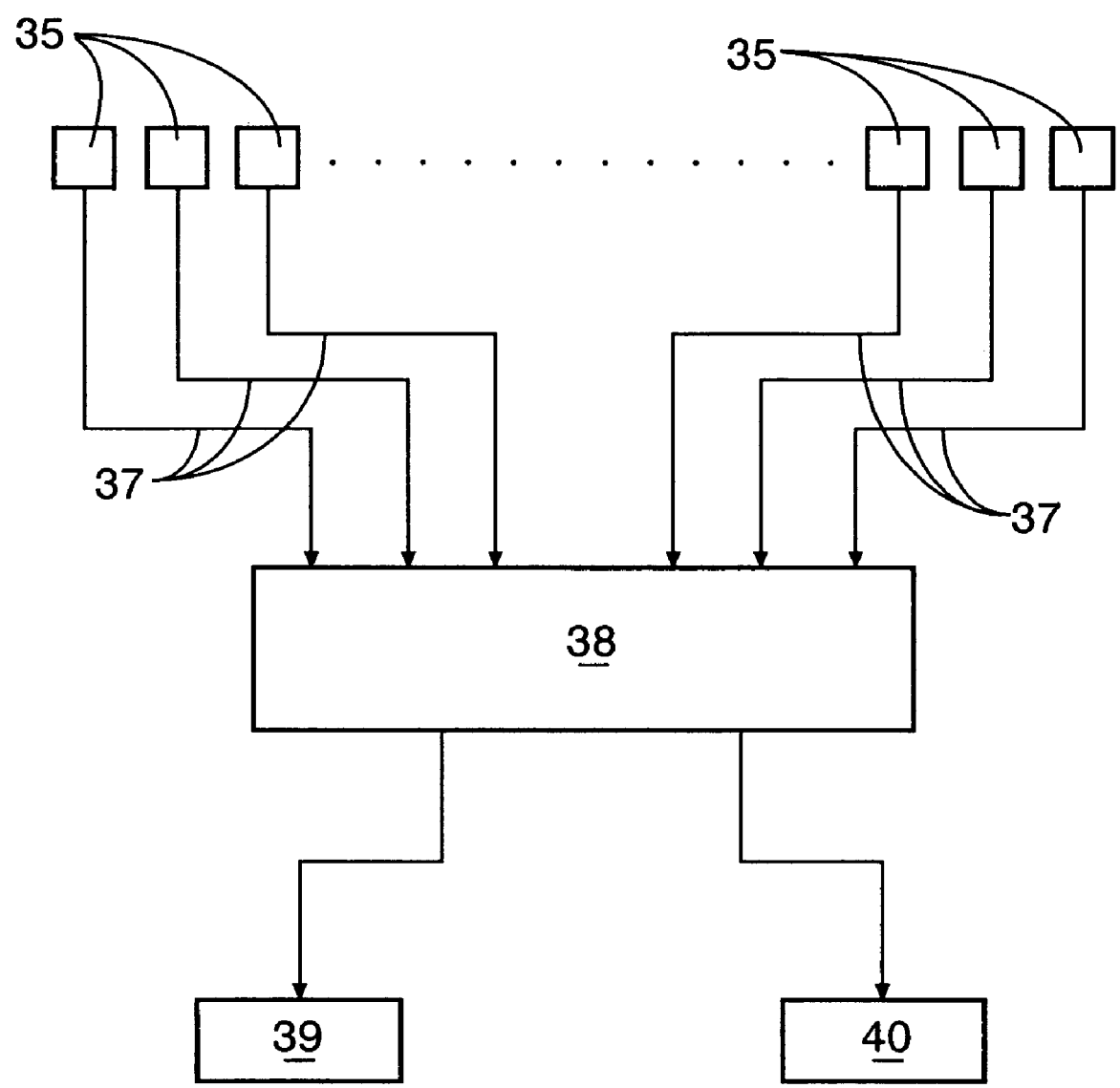
FIG. 6 is a block diagram of a system for determining a pressure distribution from outputs from distortion gauges.

As shown in FIG. 6, a harness 37 extending from each of the distortion gauges 35 is connected to a pressure conversion means 38 through an opening 11d (see FIG. 2) running in the span direction through the first wing body 11. A monitor 39 and a printer 40 are connected to the pressure conversion means 38.

Steps of molding the measuring segment 13 having the above-described structure by an optical molding method will be described with reference to diagrams in FIGS. 7A, 7B and 7C.

Figure 7A:
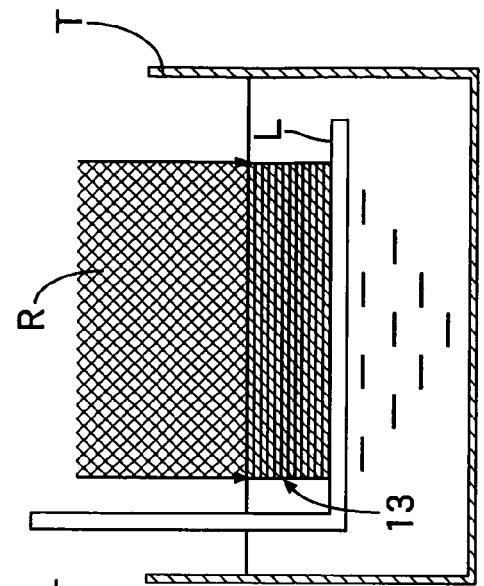
FIGS. 7A, 7B and 7C are diagrams for explaining an optical molding method.
Figure 7B:
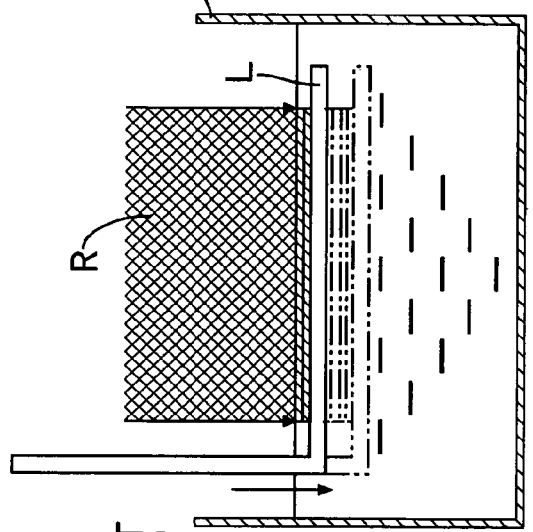
Figure 7C:
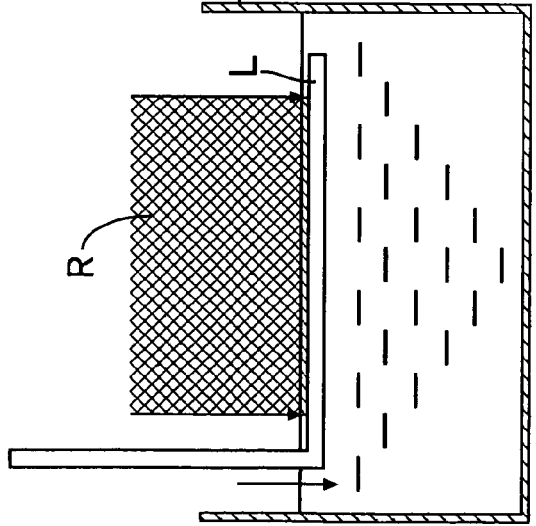

As shown in FIG. 7A, a lift L connected to a drive source (not shown) is ascendably and descendably mounted in a tank T filled with a photo-curing resin. In a state in which an upper surface of the lift L is positioned one pitch (e.g., 0.1 mm) lower than a surface of the photo-curing resin, a ultraviolet laser beam R of a predetermined pattern is applied to a thin film of the photo-curing resin on the lift L, thereby curing the photo-curing resin corresponding to the applied portion to form a first resin layer. Then, as shown in FIG. 7B, after the lift L is lowered one pitch, the ultraviolet laser beam R of the predetermined pattern is applied to a thin film of the photo-curing resin covering the first resin layer, thereby curing the photo-curing resin corresponding to the applied portion to form a second resin layer laminated on the first resin layer. By applying the ultraviolet laser beam R each time the lift L is lowered one pitch in this way, portions of the entire measuring segment 13 are formed sequentially from one end to the other end in the span direction (see FIG. 7C).

The sectional shape of the measuring segment 13 in the cord direction in the present embodiment includes opposite end portions in the span direction, portions where the longitudinal frames 31, 31 exist, and an intermediate portion in the span direction, a portion where the thin membranes 34 exist, that is, the ultraviolet laser beam R is applied in two patterns. By employing the optical molding method in this way, the measuring segment 13 having a complicated internal shape can be integrally formed with a high accuracy and a low cost.

The operation of the embodiment of the present invention having the above-described arrangement will be described below.

When the wing model W is disposed in a wind tunnel and the operating handle 25 is operated, the turntable 16 is turned about the rotary shaft 19, whereby the angle of elevation of the wing model W is set as desired. When air is fed into the wind tunnel in this state, the air flows along the outer surfaces of the first and second wing bodies 11 and 12 and the measuring segment 13, so that the flow rate on the outer surface of an extrados of the wing model W is increased to generate a negative pressure, and the flow rate on the outer surface of an intrados is decreased to generate a positive pressure. When the negative pressure acts on the outer surfaces of the thin membranes 34 of the measuring segment 13, the thin membranes 34 slightly deforms outwards. Thus, the distortion gauges 35 bonded to the back faces of the thin membranes 34 is deformed accordingly, thereby resulting in a change in electric resistance. The pressure conversion means 38 converts the outputs from the plurality of the distortion gauges 35 into pressures on the surfaces of the thin membranes 34, thereby outputting a pressure distribution on the surface of the wing model W to the monitor 39 or the printer 40.

As described above, the distortion gauges 35 are fixed to the back faces of the thin membranes 34 of the measuring segment 13 to measure the pressure distribution. Thus, it is possible to suppress the turbulence of the airflow in the case where the distortion gauges 35 are fixed to the surfaces of the thin membranes 34 or the case where the conventional pressure detecting bores is used, thereby improving accuracy in measuring the pressure distribution. The deformation amount of the thin membranes 34 is extremely small. Thus, the influence of such deformation to the airflow is negligible.

In addition, the measuring segment 13 is integrally formed without generating a step or a gap generated on the outer surface along which the air flows. Thus, it is possible to suppress the turbulence of the airflow to further improve accuracy in measuring the pressure distribution. Moreover, the outer peripheral portions of the thin membranes 34 are integrally connected to the high-rigidity frame assembly 33 which is constituted by connecting the longitudinal frames 31, 31 and the lateral frames 32 into the frame shape. Thus, it is possible to stably deform the thin membranes 34 alone, leading to a further improvement of accuracy in measuring the pressure distribution.

Also, the conventional pressure detecting bores formed in the wing model W are not required. Thus, the measuring accuracy cannot be degraded due to stain and dust adhering to the pressure detecting bores. Further, the conventional passages provided between the pressure detecting bores and the pressure sensors is not required. Thus, it is possible to prevent the generation of pressure loss, pressure leakage and measurement time-lag which are caused by the passages, thereby improving the detecting accuracy. Furthermore, the pressure measurement range can be easily adjusted by merely changing the thickness of the thin membranes 34.

Although the embodiment of the present invention has been described above, various modifications in design can be made without departing from the subject matter of the present invention.

For example, the measuring segment 13 in the embodiment is integrally molded from the synthetic resin by the optical molding method. However, any other material and producing method may be used.

Figure 8:
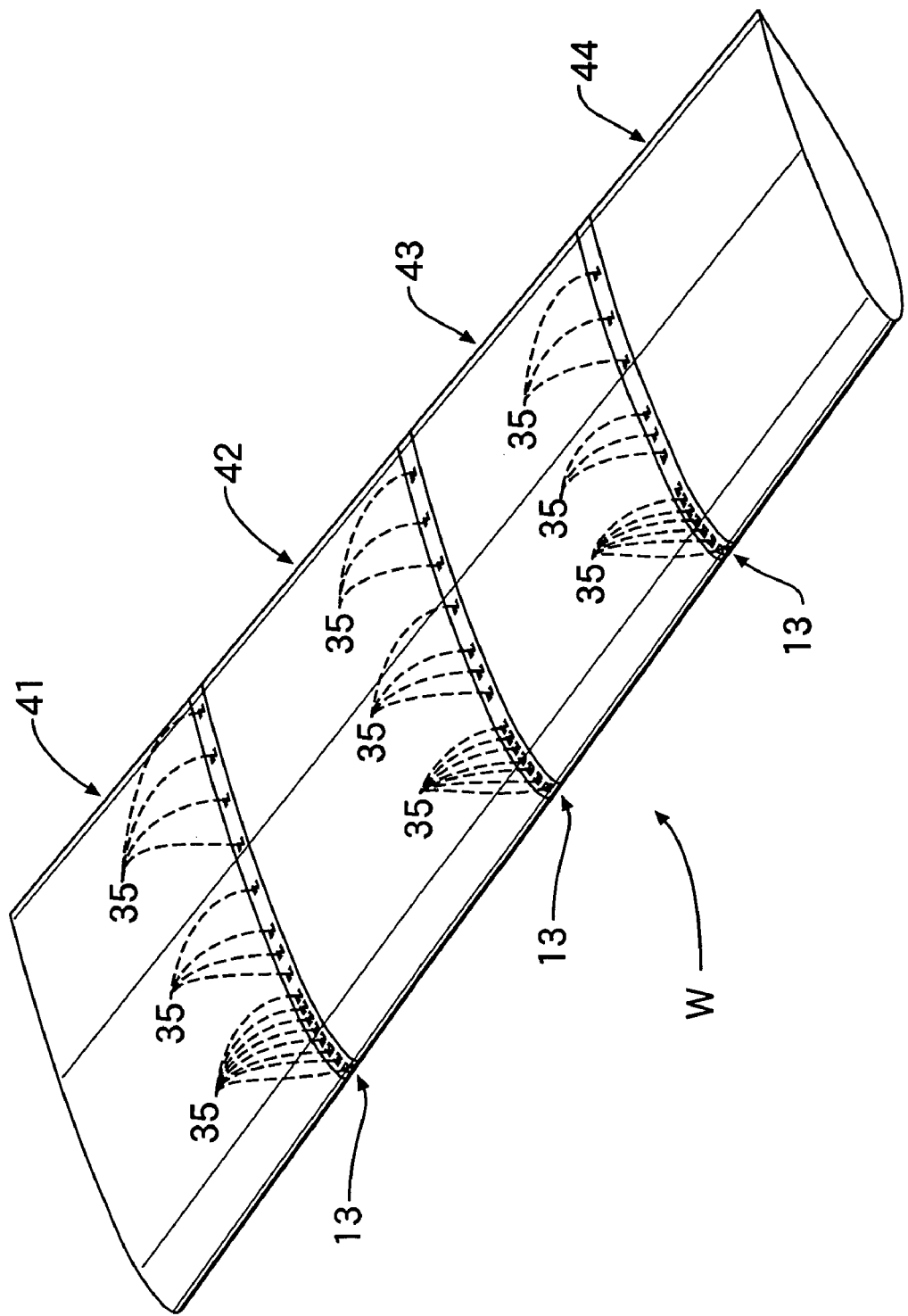
FIG. 8 is a perspective view of a wing model according a second embodiment.

In addition, the wing model W in the first embodiment includes only one measuring segment 13. However, if a plurality of wing bodies 41 to 44 and a plurality of measuring segments 13 are alternately disposed in a span direction on a tapered wing model W, as in a second embodiment shown in FIG. 8, pressure distributions at different locations in the span direction can be measured simultaneously.

Further, the object, whose pressure distribution is measured by the pressure distribution measuring system of the present invention, is not limited to the wing model W for the wind tunnel test, and includes actual objects and their models such as:

a wing, a body, a propeller and a rotor of an air plane;
a body and an aero-part of an automobile;
a body of a railway vehicle;
a hull, a screw, a hydrofoil of a ship;
a blade of a compressor, a blade of a turbine, and a fan of a fluid machine such as an blower;
a building; and
a bridge beam.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A pressure distribution measuring system for measuring a pressure distribution along a predetermined fluid flow direction on a surface of an object moving relative to a fluid, comprising:
    a measuring segment which has a predetermined width in a direction substantially vertical to a flow direction of the fluid, said measuring segment being integrally formed in the object;
    a plurality of thin membranes formed on a surface of the measuring segment at predetermined intervals in the flow direction; and
    a distortion gauge fixed to a back face of each of the plurality of thin membranes to output an electric signal which is converted by a pressure conversion means into pressure, thereby measuring the pressure distribution in the flow direction.

2. The pressure distribution measuring system according to claim 1, wherein the measuring segment includes a frame assembly constructed by connecting together longitudinal frames extending in the flow direction and lateral frames extending in a direction orthogonal to the longitudinal frames and that outer peripheries of the thin membranes are connected to the longitudinal frames and the lateral frames.

3. The pressure distribution measuring system according to claim 1, wherein the measuring segment is integrally formed by an optical molding method.

4. The pressure distribution measuring system according to claim 2, wherein the measuring segment is integrally formed by an optical molding method.

5. The pressure distribution measuring system according to claim 1, wherein the object includes a plurality of the measuring segments disposed at intervals in a direction substantially vertical to the flow direction.

6. The pressure distribution measuring system according to claim 2, wherein the object includes a plurality of the measuring segments disposed at intervals in a direction substantially vertical to the flow direction.

7. The pressure distribution measuring system according to claim 3, wherein the object includes a plurality of the measuring segments disposed at intervals in a direction substantially vertical to the flow direction.

8. The pressure distribution measuring system according to claim 1, wherein the measuring segment is formed in the object without a gap or step.

9. The pressure distribution measuring system according to claim 1, wherein a pressure loss, a pressure leakage and a measurement time-lag are prevented by connecting the distortion gauge directly to a back face of each of the plurality of thin membranes.

10. The pressure distribution measuring system according to claim 1, wherein the object is a wing of an airplane.

11. A pressure distribution measuring system for measuring a pressure distribution along a predetermined fluid flow direction on a surface of an object moving relative to a fluid, comprising:
    a measuring segment having a predetermined width in a direction substantially vertical to a flow direction of the fluid;
    a plurality of membranes spaced relative to each other and being formed on a surface of the measuring segment at predetermined intervals in the flow direction;
    a distortion gauge secured to predetermined ones of the plurality of membranes for outputting an electric signal; and
    a pressure conversion means operatively connected to said distortion gauge for converting the electric signal into pressure, thereby measuring the pressure distribution in the flow direction.

12. The pressure distribution measuring system according to claim 11, wherein the measuring segment includes a frame assembly constructed by connecting together longitudinal frames extending in the flow direction and lateral frames extending in a direction orthogonal to the longitudinal frames and that outer peripheries of the thin membranes are connected to the longitudinal frames and the lateral frames.

13. The pressure distribution measuring system according to claim 11, wherein the measuring segment is integrally formed by an optical molding method.

14. The pressure distribution measuring system according to claim 12, wherein the measuring segment is integrally formed by an optical molding method.

15. The pressure distribution measuring system according to claim 11, wherein the object includes a plurality of the measuring segments disposed at intervals in a direction substantially vertical to the flow direction.

16. The pressure distribution measuring system according to claim 12, wherein the object includes a plurality of the measuring segments disposed at intervals in a direction substantially vertical to the flow direction.

17. The pressure distribution measuring system according to claim 13, wherein the object includes a plurality of the measuring segments disposed at intervals in a direction substantially vertical to the flow direction.

18. The pressure distribution measuring system according to claim 11, wherein the measuring segment is formed in the object without a gap or step.

19. The pressure distribution measuring system according to claim 11, wherein a pressure loss, a pressure leakage and a measurement time-lag are prevented by connecting the distortion gauge directly to a back face of each of the plurality of thin membranes.

20. The pressure distribution measuring system according to claim 11, wherein the object is a wing of an airplane.

* * * * *